United States Patent [19]

Haglid

[11] 4,322,366
[45] Mar. 30, 1982

[54] WASTE TREATMENT PROCESS
[75] Inventor: Frank R. Haglid, Wilmington, Del.
[73] Assignee: E. I. Du Pont de Nemours and Company, Wilmington, Del.
[21] Appl. No.: 143,485
[22] Filed: Apr. 24, 1980
[51] Int. Cl.$^3$ ............................................. C07C 119/18
[52] U.S. Cl. ................................. 260/453.3; 568/949; 564/253; 260/453 P
[58] Field of Search ......... 260/453 RW, 453.3, 453 P; 568/949; 564/253

[56] References Cited
U.S. PATENT DOCUMENTS
3,821,266 6/1974 Mulder et al. .............. 260/453 RW Primary Examiner—John M. Ford
Assistant Examiner—Robert C. Whittenbaugh

[57] ABSTRACT

Processes for the treatment of toxic and malodorous wastestreams produced in the manufacture of methomyl and related compounds are provided. In these processes, methomyl and related compounds are oxidized with chlorine at a temperature of at least about 70° C., preferably in the range of about 70°–95° C., preferably under acidic conditions, and then the resulting intermediate compounds are hydrolyzed with NaOH, KOH or Ca(OH)$_2$ at a temperature of at least about 70° C., preferably in the range of about 70°–100° C., and at a reaction medium pH of at least about 9.5. The process is preferably carried out continuously.

7 Claims, 1 Drawing Figure

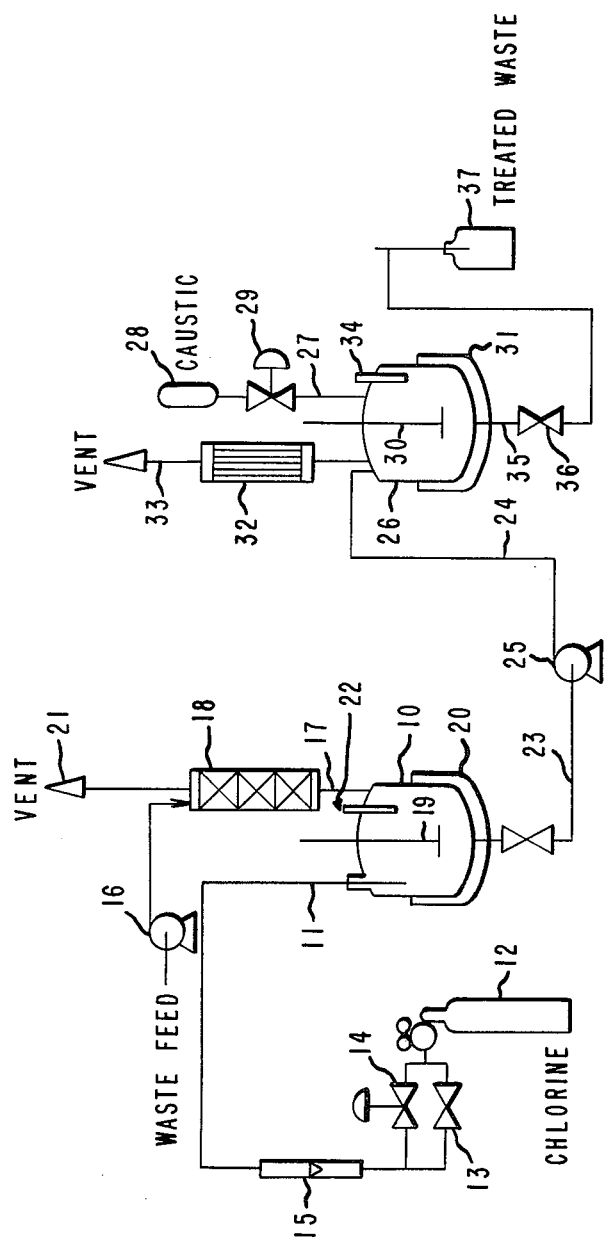

WASTE TREATMENT PROCESS

BACKGROUND OF THE INVENTION

1. Field of the Invention

This invention relates to processes for the treatment of malodorous waste streams and more particularly to oxidative waste treatment processes for thioacetimidates.

2. Prior Art

Certain thioacetimidate derivatives such as methomyl are effective insecticides. These compounds and their preparation are described in U.S. Pat. No. 3,576,834, granted Apr. 27, 1971, to J. B. Buchanan. Preparation of certain intermediates for these compounds is described in U.S. Pat. No. 3,574,736, granted Apr. 13, 1971, to J. J. Fuchs. In the processes described, a number of waste streams are produced containing compounds which are very malodorous and in some cases also toxic. Traditionally, the waste streams are incinerated for disposal; however, because their major component is water, large amounts of fuel such as oil or natural gas are required. Because of the current energy situation, an alternative waste treatment process for these compounds is desirable.

The malodorous components in the above-described waste streams are mainly the sulfur-containing thioacetimidates. It is known in the art that sulfur-containing compounds can be oxidized by chlorine (Houben-Weyl, Methoden der organischem Chemie, Volume IX, p. 81, 1955). Unfortunately, chlorine oxidation of certain of these sulfur-containing compounds in the waste stream produces compounds that are explosive and/or toxic. Thus, any accumulation of these compounds in a separate oil phase represents a potential hazard.

SUMMARY OF THE INVENTION

According to the present invention there is provided a waste treatment process comprising (a) contacting an aqueous waste from the production of a compound of the formula:

$$CH_3-\underset{\underset{SR}{|}}{C}=N-OR^1$$

wherein R is $CH_3$ or $C_2H_5$; and $R^1$ is H,

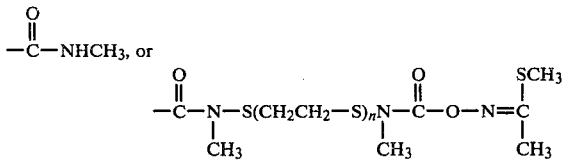

wherein n is 0 or 1 with $Cl_2$ at a temperature of at least about 70° C. for a time sufficient to complete oxidation, and (b) contacting the resulting reaction mass with a basic compound selected from KOH, NaOH and Ca(OH)$_2$ at a pH greater than about 9.5 and at a temperature of at least about 70° C.

According to a preferred embodiment, the waste treatment is continuous and comprises (a) continuously feeding chlorine and an aqueous waste resulting from the production of one or several of the above-described compounds to an oxidation reaction zone maintained at a temperature in the range of about 70°–95° C., the aqueous waste being fed to the reaction zone through a scrubbing zone where off-gases from the reaction zone are contacted with the aqueous waste, and the chlorine being fed at a rate sufficient to maintain the oxidation-reduction potential of the reaction medium in the oxidation zone in the range of about 500–1200 millivolts, as measured between a platinum electrode and a silver electrode; (b) continuously withdrawing oxidized reaction mixture from the oxidation reaction zone and feeding it and a basic compound selected from the group consisting of NaOH, KOH and Ca(OH)$_2$ to a hydrolysis reaction zone maintained at a temperature in the range of about 70°–100° C., the basic compound being fed at a rate sufficient to maintain the pH of the reaction medium in the hydrolysis zone greater than about 9.5; and (c) continuously withdrawing hydrolyzed reaction mixture from the hydrolysis zone.

BRIEF DESCRIPTION OF THE DRAWING

The drawing is a schematic flow diagram showing a continuous process according to the invention.

DETAILED DESCRIPTION OF THE INVENTION

The process of the invention can be shown by the following reaction sequence:

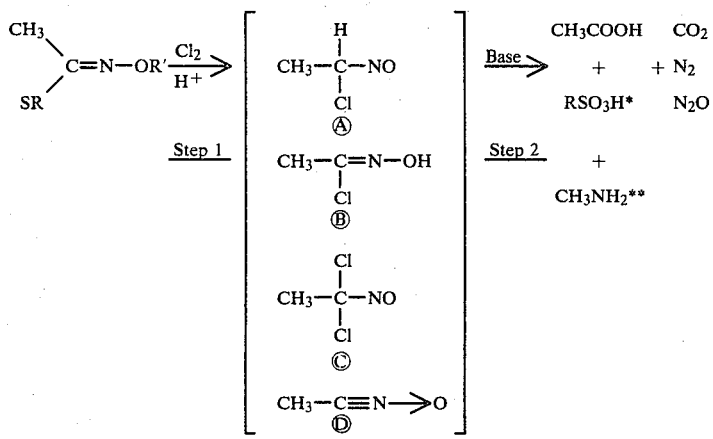

A = 1-chloro-1-nitrosoethane

B = acethydroxamoyl chloride
C = 1,1-dichloro-1-nitrosoethane
D = acetonitrile oxide
*In $R^1$ group where n = 0, sulfuric acid is also formed and where n = 1, ethane disulfonic acid is also formed.
**Methyl amine does not form where $R^1$ = H.

It has been found that by conducting step 1 of the process at or above the autodecomposition point of the thermally most stable of the explosive intermediates (in the above reaction sequence compound C) accumulation of compound C as a separate oil phase, which could be hazardous, is avoided. This, coupled with conducting step 1 on the acidic side, enables the process to be controlled effectively on a continuous basis, since on the alkaline side the oxidation-reduction potential signal response is sluggish and unsuitable for process control. While a continuous process is preferred, the process of the invention can be carried out batch-wise.

With reference to the drawing, gaseous chlorine is fed into oxidation reaction vessel 10 equipped with stirrer 19 via line 11 from a pressurized storage tank 12. The chlorine feed rate is controlled by a by-pass valve 13 and a control valve 14 and monitored by flow meter 15. An aqueous waste stream containing one or more thioacetimidates and their by products, such as encountered in the manufacture of methomyl, and related insecticides as described in U.S. Pat. No. 3,576,834, is pumped by pump 16 into reaction vessel 10 via line 17 and counter-current scrubber column 18. Reaction vessel 10 is equipped with steam jacket 20 so that the reaction vessel can be heated and maintained at a temperature of at least about 70° C., a temperature above the autodecomposition point of compound C. The upper temperature limit is about the boiling point of the reaction mixture at ambient pressure, i.e., about 95° C. The preferred temperature range is about 80°–95° C.

During oxidation of thioacetimidates with chlorine in reaction vessel 10, off-gases (e.g. nitrogen, nitrous oxide, carbon dioxide) are formed which tend to carry with them some chlorine and some of the intermediates in gaseous form, particularly compound D. When this gas mixture enters scrubber 18, which is operated at an ambient temperature and pressure, the chlorine and intermediates in the off-gases (e.g. compound D) react to form compounds A, B or C, which are then returned to the oxidation reaction vessel. The counter-current flowing waste stream is an excellent scrubbing medium for the off-gases. The scrubbed off-gases are then vented through line 21 to a vapor incinerator or flare, preferably burned in order to remove any odor carried with the inert gases from the waste stream.

It is preferred that the oxidation reaction conducted in vessel 10 be on the acidic side for ease of control. Since hydrochloric acid and other acids are formed in this reaction, the acidic conditions are inherent in the reaction. The entering waste stream is preferred to be near a neutral pH; however, a basic waste stream can be tolerated as long as the net result is an acidic condition in the oxidation reaction. If the waste stream is rich in organic materials, cooling of vessel 10 may be required to maintain the required temperature.

The chlorine feed rate to vessel 10 is controlled so as to maintain an oxidation-reduction potential of between about 500–1200 millivolts, preferably about 600–900 millivolts, as measured between platinum and silver electrodes of an oxidation-reduction potential (ORP) probe 22 extending through vessel 10 into the reaction medium. The output of the ORP probe can be used for chlorine flow control via control valve 14 by conventional means. If the oxidation-reduction potential is maintained at a lower potential, the oxidation reaction may be incomplete. A higher potential is unnecessary and wasteful of chlorine.

Residence time in vessel 10 should be sufficient to allow essentially complete oxidation of the thioacetimidates. Generally, a time of 10 minutes to 2 hours is adequate depending upon well known reaction rate considerations such as temperature.

Oxidized reaction mixture in the acidic reaction medium from oxidation vessel 10 is fed via lines 23 and 24 by pump 25 to hydrolysis reaction vessel 26 where base, fed into vessel 26 through line 27 from storage tank 28 and through control valve 29, hydrolyzes intermediate compounds such as compounds A–D. The main hydrolysis products are acetate and sulfonate. While sodium hydroxide is the preferred base, potassium hydroxide and calcium hydroxide can also be used. Reaction vessel 26 is equipped with a stirrer 30, condenser 32 and a steam jacket 31 so that reaction vessel 26 can be heated and maintained at a temperature of at least about 70° C., preferably in the range of about 70°–100° C., and most preferably about 80°–95° C. A vent line 33 from condenser 32 allows small amounts of gaseous products such as methyl amine and ammonia to be vented or burned.

The base feed rate to hydrolyzer 26 is controlled so as to maintain the reaction medium at a pH of greater than about 9.5, preferably between about pH 10–11. A pH probe 34 extends through vessel 26 into the reaction medium so as to monitor and control pH. Temperature and pH controls are needed to obtain satisfactory hydrolysis rates. A higher temperature or pH will require more costly materials of construction in the reaction vessel and auxiliary equipment. For the reaction conditions employed, reaction times will range from about 10 minutes to about two hours.

Hydrolyzed reaction mixture from hydrolyzer 26 is withdrawn through line 35 and valve 36 and is then collected in collection vessel 37 for subsequent treatment such as neutralization, biooxidation and nitrification.

The invention can be further understood by the following example in which percentages are by weight.

Thirty-eight liters of a methomyl manufacturing process aqueous waste sample containing 0.76% S-methyl-N-[(methylcarbamoyl)oxy]-thioacetimidate, 0.65% S-methyl-N-hydroxy-thioacetimidate, 0.13% dimethyl disulfide, 0.04% methyl thiolacetate and minor amounts of a number of other compounds (some of them unidentified) was continuously treated using the apparatus and flows shown in the drawing. The sample was extremely malodorous. The reactors were steam heated 1-liter glass reactors and the scrubber was a five-plate Oldershaw column operated at room temperature and atmospheric pressure. The waste feed rate was 45 ml/min, the temperature of both reactors was maintained at 80° C., the oxidation-reduction potential in the oxidizer was maintained automatically at 700-800 mV using an oxidation-reduction potential probe having a platinum electrode and a silver electrode and the pH in the hydrolyzer was controlled similarly at pH 10.5 with sodium hydroxide. The run lasted 14 hours. 1.1 Kg of chlorine and 3.2 kg of 50% sodium hydroxide were consumed. 154 Ml concentrated hydrochloric acid was required to bring the treated hydrolyzed waste to pH 7. The treated waste so obtained contained no detectable thioacetimidates. Sodium acetate, sodium methane sulfonate and sodium chloride were the major components of the waste stream which also contained a few minor identified innocuous components. An odor evaluation detected only a faint acetamide-like smell. Evaluation of the neutralized waste in biotreatment simulators showed the treated waste to be highly biocompatible both in biooxidation and the subsequent nitrification step.

What is claimed is:

1. A waste treatment process for reducing the level of odorous or toxic compounds without accumulating other toxic or explosive compounds in the treated waste stream comprising: (a) contacting an aqueous waste from the production of a compound of the formula:

$$CH_3-\underset{S[R]CH_3}{\overset{}{C}}=N-OR^1$$

wherein $R^1$ is H, or $$-\overset{O}{\underset{}{\overset{\|}{C}}}-NHCH_3$$

with $Cl_2$ under acidic conditions at an oxidation-reduction potential in the range of about 500-1200 millivolts as measured between a platinum electrode and a silver electrode at a temperature of at least about 70° C. for a time sufficient to complete oxidation; and (b) contacting the resulting reaction mass with a basic compound selected from NaOH, KOH, and Ca(OH)₂ at a pH greater than about 9.5 and at a temperature of at least about 70° C.

2. The process of claim 1 wherein the temperature in both oxidation step (a) and hydrolysis step (b) is in the range of about 70°-95° C.

3. The process of claim 2 wherein the oxidation-reduction potential is in the range of about 600-900 millivolts and the basic compound is NaOH.

4. The process of claim 3 wherein the pH in step (b) is in the range of about 10-11, and the temperature in both oxidation step (a) and hydrolysis step (b) is in the range of about 80°-95° C.

5. A continuous waste treatment process for reducing the level of odorous or toxic compounds without accumulating other toxic or explosive compounds in the treated waste stream comprising: (a) continuously feeding $Cl_2$ and an aqueous waste from the production of a compound of the formula:

$$CH_3-\underset{S[R]CH_3}{\overset{}{C}}=N-OR^1$$

wherein $R^1$ is H, or $$-\overset{O}{\underset{}{\overset{\|}{C}}}-NHCH_3$$

to an oxidation reaction zone maintained at a temperature in the range of about 70°-95° C., the aqueous waste being fed to the reaction zone through a scrubbing zone where off-gases from the reaction zone are contacted with the aqueous waste, and the chlorine being fed at a rate sufficient to maintain the oxidation-reduction potential of the reaction medium in the oxidation zone in the range of about 500-1200 millivolts as measured between a platinum electrode and a silver electrode; (b) continuously withdrawing oxidized reaction mixture from the oxidation reaction zone and feeding it and a basic compound selected from the group consisting of NaOH, KOH and Ca (OH)₂ to a hydrolysis reaction zone maintained at a temperature in the range of about 70°-100° C., the basic compound being fed at a rate sufficient to maintain the pH of the reaction medium in the hydrolysis zone greater than about 9.5; and (c) continuously withdrawing hydrolysis reaction mixture from the hydrolysis zone.

6. The process of claim 5 wherein the oxidation reaction zone and the hydrolysis reaction zone are maintained at a temperature in the range of about 80°-95° C., and the reaction medium in the hydrolysis zone is maintained at a pH in the range of about 10-11 with NaOH.

7. The process of claim 5 or claim 6 wherein the oxidation reaction zone is maintained at an oxidation-reduction potential in the range of about 600-900 millivolts.

* * * * *